D. L. DOWLING.
VALVE.
APPLICATION FILED FEB. 20, 1917.
1,235,884.
Patented Aug. 7, 1917.
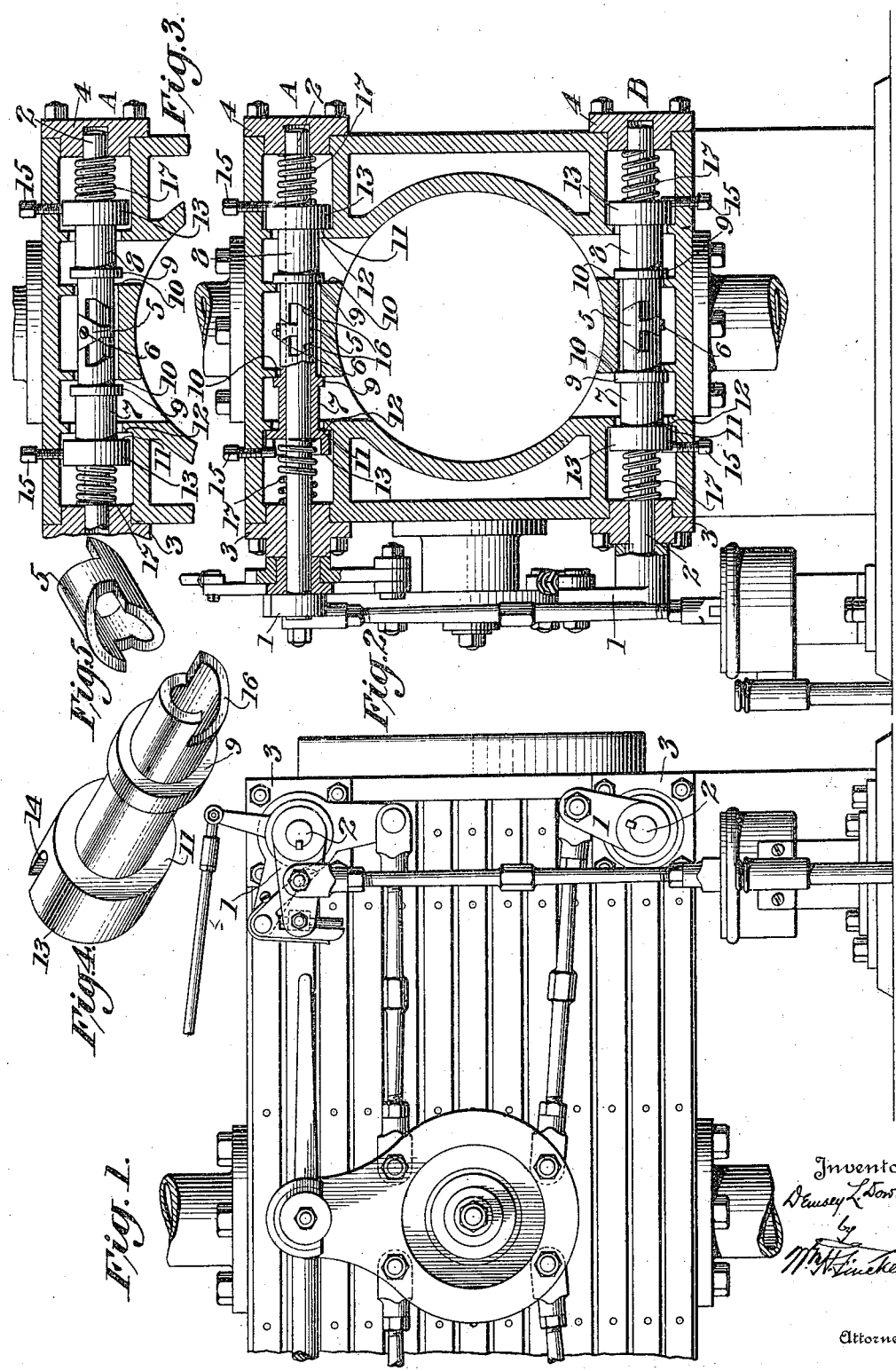

UNITED STATES PATENT OFFICE.

DEMSEY L. DOWLING, OF EXMORE, VIRGINIA.

VALVE.

1,235,884. Specification of Letters Patent. Patented Aug. 7, 1917.

Application filed February 20, 1917. Serial No. 149,768.

*To all whom it may concern:*

Be it known that I, DEMSEY L. DOWLING, a citizen of the United States, residing at Exmore, in the county of Northampton and State of Virginia, have invented a certain new and useful Improvement in Valves, of which the following is a full, clear, and exact description.

The primary object of this invention is to provide a valve mechanism for steam engines of the Corliss engine type, in which a single cam acting upon both valves positively opens them and then releases them for closing under the recoil of springs, the mechanism being such that worn or damaged valves may be readily removed and substitutes fitted in place with little disturbance of the engine and very economically.

The invention consists of a valve mechanism comprising an oscillating valve stem adapted to be actuated by any common and well known means, and having fixed to it a valve-actuating cam which is interposed between opposite valves which have only a longitudinal sliding motion on the stem, these valves being held to their seats primarily by spring pressure and opened by the cam as the stem is oscillated in one direction, the reverse motion of the stem moving the cam so that the springs are free to act to seat the valves, as I will proceed now to explain and finally claim.

In the accompanying drawings illustrating the invention, in the several figures of which like parts are similarly designated, Figure 1 is an elevation of sufficient of a Corliss engine to illustrate the application of the invention to that type of engine. Fig. 2 is a transverse section showing both the steam valves and the exhaust valves in closed position. Fig. 3 is a similar cross-section of the upper end of the engine with the valves opened. Fig. 4 is a perspective view of one of the valves, and Fig. 5 is a perspective view of the cam detached and on a larger scale.

For convenience of illustration of the invention, it is shown as applied to a Corliss engine, and it is assumed that the mechanism of the Corliss engine is so well known as to require no detail description here, same being adequately shown in the drawings, and it is sufficient to say that the lever 1 is keyed to the valve stem or spindle 2 so as to oscillate said stem. This stem is journaled in the removable valve chest heads 3 and 4, and is provided with a cam 5 fixed thereto, as by a screw 6, so as to turn with the stem. The valves 7 and 8 are sleeve-like structures loosely mounted on the stem on opposite sides of the cam so as to be capable of longitudinal movement on the stem toward and away from the cam. The several valves are alike, excepting that of the pair on each stem one is right and the other left so as to insure their proper motions, and with this difference in mind a description of one will suffice for all. Each valve has a valve disk 9 operating in connection with the valve seat 10 in the steam chest, and a valve disk 11 operating in connection with a valve seat 12 also in the steam chest. The disk 11 has a circular flange 13 provided with a notch 14 to receive a screw or other stop 15 which while allowing the longitudinal movement of the valve, prevents it from rotating or turning with the stem, and each valve also is provided with a cam-like extension 16 complemental in contour to the adjacent face of the cam 5. Provision will be made in these cam surfaces for lost motion incident to the valve actuating mechanism, if necessary. Each valve also is provided with a spring 17 interposed between the back of the valve disk 12 and the steam chest heads so as to exert longitudinal pressure on the valves to seat them when relieved of the action of the cam.

Thus it will be seen that the cam positively acts upon the valves to open them, and in the reverse movement the pressure of the cams on the valves is relieved and the spring is free to act to reseat the valves.

The steam inlet valves A and the exhaust valves B are alike in construction, and by proper rearrangement are interchangeable, so that there is economy in first cost as well as in installation and repairs or renewals.

As will be seen, access to the valves is readily had by removal of the heads. They may be removed from the chest by pulling out at each end after removal of heads 3 and 4.

The valves are balanced, friction is practically eliminated, and very little oil is required for lubrication. There is little or no liability of the wearing of the valve seats, and thus the leakage of steam is practically wholly prevented. High steam pressure and high degree of superheating can be used without warping the valves.

The valves of this invention may be applied to the common Corliss engine cylinder at a minimum of expense, and with steam economy equal to or greater than that of the common oscillating type of valve.

Obviously the valves may be kept in good operating condition in a very economical manner, since their construction and operation are of notable simplicity.

Variations in details of construction are permissible within the principle of the invention as herein claimed; and it is to be noted also that the invention is not limited in its use to Corliss engines, since it is adaptable to other engines of the same general type which employ oscillating valves.

What I claim is:—

1. A valve mechanism of the character described, comprising an oscillating stem, a cam fixed to and turning with said stem, and a sleeve-like member longitudinally slidable upon the stem and having a cam surface complemental to the cam on the stem and a suitable number of valve disks, and means to force the cam surface into operative relation to the cam on the stem.

2. A valve mechanism of the character described, comprising an oscillating stem, a cam fixed to and turning with said stem, and valves slidably mounted upon the stem and having complemental cam faces for coöperation with the cam to open the valves.

3. A valve mechanism of the character described, comprising an oscillating stem, a cam fixed to and turning with said stem, and valves slidably mounted upon the stem and having complemental cam faces for coöperation with the cam to open the valves, and means to effect the closing of the valves upon the reverse movement of the cam.

4. A valve mechanism of the character described, comprising an oscillating stem, a cam fixed to and turning with said stem, and valves slidably mounted upon the stem and having complemental cam faces for coöperation with the cam to open the valves, and springs adapted to exert a pressure on the valves lengthwise of the stem to seat them upon the reverse movement of the cam.

5. A valve mechanism of the character described, comprising an oscillating stem, a cam fixed to and turning with said stem, and valves slidably mounted upon the stem and having complemental cam faces for coöperation with the cam to open the valves, means to prevent the valves from turning with the stem, and means to effect the seating of the valves upon the reverse movement of the cam.

6. A valve, comprising an oscillating stem, a double faced cam fixed to said stem and turning with it to open the valves, valves mounted loosely on the stem and having complemental cam faces for coöperation with the fixed cam on the stem, means to prevent the valves from turning with the stem, and means to seat the valves operative upon the reverse movement of the cam.

7. The combination with an engine cylinder having inlet and exhaust ports, of an inlet valve mechanism comprising an oscillating stem, a cam fixed thereto and turning with it, and a sleeve-like member longitudinally slidable upon the stem and having a cam surface coöperating with the cam on the stem, and a suitable number of valve disks to coöperate with the inlet ports, and means to seat the disks, and an exhaust valve mechanism of similar construction and mode of operation.

8. The combination with an engine cylinder having a ported valve chest and removable heads therefor, of a valve mechanism comprising an oscillating valve stem journaled in said heads and provided with a fixed cam turning therewith, and a sleeve-like member longitudinally slidable upon the stem and having a cam surface coöperating with the cam on the stem and a suitable number of valve disks to coöperate with the ports, and means to seat the disks, the valve mechanism being bodily removable from the valve chest.

In testimony whereof I have hereunto set my hand this 17th day of February, A. D. 1917.

DEMSEY L. DOWLING.

Witnesses:
JAMES H. ASHBY,
J. M. YOUNG.

Copies of this patent may be obtained for five cents each, by addressing the "Commissioner of Patents, Washington, D. C."